United States Patent Office 2,972,613
Patented Feb. 21, 1961

2,972,613

CYCLIC CHOLINE XANTHATE

Myer Freed, Chicago, Ill., assignor to Dawe's Laboratories, Inc., Chicago, Ill., a corporation of Illinois No Drawing. Filed Mar. 9, 1959, Ser. No. 797,831

4 Claims. (Cl. 260—243)

This invention relates to a choline derivative and to a method for the manufacture of same, and it is an object of this invention to produce a new and improved choline derivative suitable for use in pharmaceutical and feed supplement compositions, and it is a related object to provide a method for the manufacture of same.

This is a continuation-in-part of my copending application Ser. No. 644,752, filed March 8, 1957, entitled "Choline Xanthate," now abandoned.

Choline is a vitamin that has found widespread use as a component in pharmaceutical preparations and in animal feed supplements. While its utility has been clearly established for such purposes, there are a number of objectionable characteristics in the use of choline, especially from the standpoint of the preparation of the choline and in its processing for the manufacture of compositions therewith. Because of the highly caustic nature of choline and because of its highly objectionable odor, it has been found impractical to make use of choline as a pure, or as a relatively pure, compound in the preparation of the various pharmaceutical compositions or feed supplements. To the present, the most extensive use has been made of choline in the form of its salt—namely, choline chloride prepared by the reaction of the choline base with hydrochloric acid. Choline chloride comprises a relatively neutral salt from which the choline can be made readily available in the digestive systems of animal or man.

It has been found, however, that some of the properties inherent in choline chloride raise difficulties even in the use of this derivative in preparations with other ingredients. For example, in the formulation of a feed supplement, the highly hygroscopic characteristics of choline chloride cause substantial amounts of water to be taken up from the atmosphere, even when the relative humidity is as low as 20%. To obviate difficulties that are encountered in the formulation with choline chloride, it has been the practice to combine the choline chloride with a dry absorbent material, as represented by dry cereal, before formulation into the feed supplement or like composition. For uniform distribution of the choline chloride in the carrier, it has been the practice to dissolve the choline chloride in an aqueous medium and then to distribute this aqueous medium, as by spraying, onto the surfaces of the dry cereal or other carrier. In order to end up with a free-flowing material, the concentration of choline chloride is limited to less than 25%, otherwise difficulties are experienced with caking in the large-scale processing and material-handling equipment.

Attempts have been made to employ other salts of choline to obviate difficulties which arise from the use of choline chloride. Choline dihydrogen citrate has been prepared for use in the formulation of pharmaceutical preparations where the cost of the final product is of lesser importance and wherein the product can tolerate such lesser concentrations of the vitamin. Choline dihydrogen citrate is markedly greater in cost than choline chloride when calculated on the amount of available vitamin by weight, since the vitamin concentration is about 47% of that available in the corresponding choline chloride. While the dihydrogen citrate is less hygroscopic than the chloride, substantial amounts of water are still absorbed from the atmosphere when at 50% relative humidity or above. These same disadvantages have been found to exist in the use of choline bitartrate. Choline bicarbonate, like choline itself, is strongly alkaline and is subject also to having a very disagreeable odor. Other choline compounds have been found to suffer from many of these same disadvantages and additional disadvantages, as represented by toxicity or lack of availability of the choline for vitamin use.

Attempts have also been made to formulate esters of choline, as represented by cyclic choline sulfate. These have been found capable of use partially to replace choline chloride for some nutritional applications, but they are incapable of use as a complete replacement. Additionally, cyclic choline sulfate is not readily converted to the normal choline salt under conditions generally found in the intestinal tract of all animals. Such conversion depends on the availability of specific enzymes capable of splitting the cyclic ester linkage. Hence, its availability as choline vitamin must be determined for each species and use. Choline esters have also been found to have a profound physiological effect and in many instances the choline is not readily available as a vitamin.

I have discovered a choline compound which is comparable in many ways to choline chloride without being subject to the deficiencies and difficulties inherent therein. By comparison with the highly hygroscopic characteristics of choline chloride, the choline compound forming the subject matter of this invention is non-hygroscopic even at relative humidities in excess of 75% at 60–100° F. It is comparable in cost and in ease of manufacture to choline chloride but it is more stable than choline chloride under a wide variety of atmospheric conditions. While the choline content is slightly less than that of the choline in choline chloride, the choline is as available as the choline in choline chloride, since the latter compound is formed from the compound produced in accordance with the practice of this invention by reaction with the weak acids, including hydrochloric acid, in the gastric juices.

The compound which will hereinafter be referred to as cyclic choline xanthate, is prepared by reaction of choline in equimolecular proportions with carbon disulfide. It is preferred to carry out the reaction in a non-active solvent as represented by water. Instead of water, use can be made of a mutual solvent such as dioxane or the carbon disulfide may be diluted with a water-immiscible non-reactive solvent as represented by ethyl ether, hexane, ethylene dichloride and the like. In the reaction, it is undesirable to make use of hydroxylated solvents, such as alcohols, glycols, and the like, since they undesirably effect the yield of the final product.

Reaction takes place upon admixture to form an opaque, yellow system with an accompanying rise in temperature which may reach the boiling point of carbon disulfide. It is desirable to control the temperature as by means of controlled mixing or by the use of a water bath of the like to maintain reaction temperature to below 45° F. unless a reflux is employed to minimize loss of ingredients. The reaction is allowed to continue with stirring for about 2 hours after the mixture has cooled down by itself to about room temperature. The mixture is then filtered and washed with minimal amounts of water. To remove traces of unreacted carbon disulfide, a further washing with a solvent such as ether, hexane or the like is desirable, or an equivalent end may be achieved, though less expeditiously, by drying the precipitate at about 80° C. or by aeration or the like.

The reaction is believed to proceed as follows:

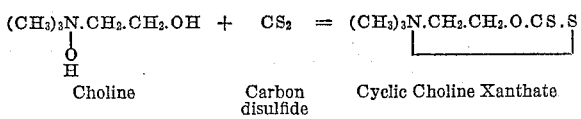

Choline     Carbon     Cyclic Choline Xanthate
              disulfide

Unlike other xanthates, no alcohol is employed in the reaction. Instead, the choline base tends to function both in the capacity of an alcohol and in the capacity of an alkali or alkaline earth hydroxide to produce what is believed to be an entirely new and different product having many desirable characteristics. Instead of being soluble in water, as are most xanthates and most choline compounds, the choline xanthate produced by the process described has been found to be poorly soluble in water. The product appears to take on the form of an ester yet, unlike cyclic choline sulfate, the ester linkage appears to be easily broken to enable conversion to choline acid salts such as choline chloride by the dilute acids, including hydrochloric acid, which are readily available in the gastric juices of man and animal.

The following will represent a specific procedure for the manufacture of a compound embodying the features of this invention.

*Example I*

2.7 moles (1 liter) of an aqueous solution of choline is mixed in a 2-liter flask equipped with a reflux condenser and mechanical stirrer. 2.7 moles (204 grams) carbon disulfide is added. Upon admixture, the temperature rises rapidly and a heavy yellow precipitate forms. The temperature is kept below 45° C. by controlling the rate of stirring. Reaction was continued with stirring for 4 hours during which the temperature of the reaction mixture dropped to about 25° C. The thick reaction mixture is then filtered through a Büchner funnel, followed by washing with a small amount of cold water. The cake is broken up and dried in vacuo at about 80° C. for 1 hour. The dried yellow crystals weighed 377 grams and chemical analysis by the Reineckate method indicated a choline chloride equivalent of 78%. The crystals remained apparently dry and free flowing during exposure to an atmosphere of 75% relative humidity at 38° C. for 2 weeks.

The amount of the basic ingredients, namely choline and carbon disulfide, may be varied above and below equimolecular proportion by as much as 10% and up to 20% with the more available and less expensive material in excess to drive the reaction in the direction for fuller utilization of the less available and more expensive component. Such excess will remain in solution to be washed from the product during purification.

The ease of conversion of choline xanthate to normal choline salts, as represented by choline chloride, has been demonstrated by assay using the Reineckate method. This produced a water-insoluble precipitate with choline salts like choline chloride, but not with an ester salt such as cyclic choline sulfate. The compound produced in accordance with the practice of this invention dissolves poorly in water but is readily brought in solution by the addition of hydrochloric acid. The solution has been found to contain choline ion as demonstrated by the normal formation of a precipitate with Reinecke salt. A similar precipitate is incapable of being formed with an ester salt such as cyclic choline sulfate unless prolonged hydrolysis with acid or alkali is provided at elevated temperature.

Direct biological tests with poultry have confirmed the biological availability of choline from the cyclic choline xanthate.

It will be understood that changes may be made in the details of formulation and in the method of preparation without departing from the spirit of the invention, especially as defined in the following claims.

I claim:

1. A compound having the following structural formula:

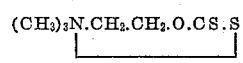

2. The method for the manufacture of a compound having the following formula:

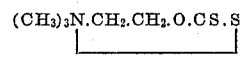

comprising the steps of reacting choline with carbon disulfide in equimolecular proportions plus or minus 20% at a temperature below 45° C.

3. The method for the manufacture of cyclic choline xanthate comprising the steps of dissolving choline in water, adding carbon disulfide in equimolecular proportions to the choline plus or minus 20%, and allowing the reaction to continue exothermically at a temperature below 45° C. until the reaction is completed by an indicated drop in temperature.

4. The method as claimed in claim 3 in which the reaction mixture is filtered to separate out the precipitate that is formed and in which the precipitate is washed with water to remove excesses of the reactive components.

No references cited.